H. P. KRAFT.
SHEET METAL NUT.
APPLICATION FILED FEB. 20, 1918.

1,367,151.

Patented Feb. 1, 1921.

WITNESS:
Rene Buine

INVENTOR:
Henry Phillips Kraft
By Attorneys,
Frauer Turk & Myers

UNITED STATES PATENT OFFICE.

HENRY PHILLIP KRAFT, OF RIDGEWOOD, NEW JERSEY.

SHEET-METAL NUT.

1,367,151. Specification of Letters Patent. Patented Feb. 1, 1921.

Application filed February 20, 1918. Serial No. 218,302.

*To all whom it may concern:*

Be it known that I, HENRY PHILLIP KRAFT, a citizen of the United States of America, residing in Ridgewood, in the county of Bergen and State of New Jersey, have invented certain new and useful Improvements in Sheet-Metal Nuts, of which the following is a specification.

This invention relates to nuts, particularly those formed of sheet metal.

The invention is especially directed to sheet metal nuts adapted for use in connection with automobile tire valves, although it is adapted for other purposes, if desired.

In a prior application filed July 25, 1914, Serial No. 853,127, I have disclosed a sheet metal nut having a recess which is provided with a filling piece adapted to occupy a part of the space of such recess so as to admit of the use of a leather or other washer of commercial thickness. The present invention is more particularly directed to a simple and economical construction whereby the filling piece is held in its recess.

Referring to the drawings, which illustrate one form of the invention,—

Figure 1:
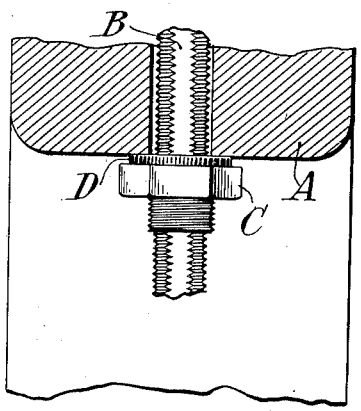
Figure 1 is a portion of a wheel rim showing also in elevation a portion of a tire valve to which is applied a nut embodying the present invention.

Referring first to Fig. 1, let A indicate a rim or felly, B a tire valve to which is applied a nut C having a leather or similar washer D. The function of the nut in this case is to act as a rim nut which screws on the tire valve casing, thus drawing the latter down to proper position.

Figure 2:
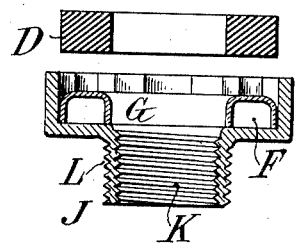
Fig. 2 is a diametrical section of the nut detached, taken on the line 2—2 in Fig. 3.
Figure 4:
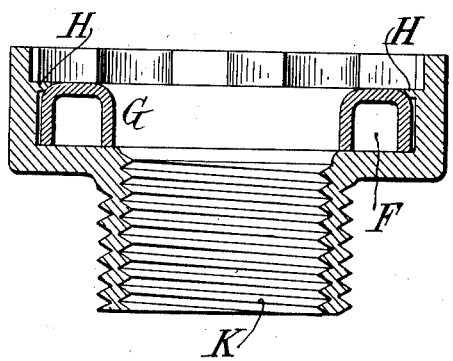
Fig. 4 is an enlarged diametrical section taken on the line 4—4 in Fig. 3.
Figure 3:
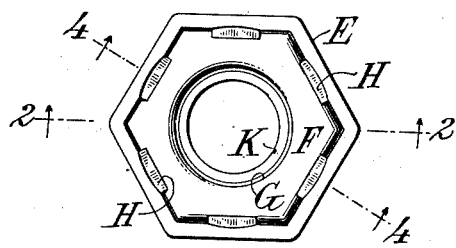
Fig. 3 is an underside view of the nut.

The nut is best illustrated in Figs. 2 to 4. It comprises a sheet metal structure usually having a hexagon or other wrench face E by means of which it may be applied. In forming the nut with a suitable depth of face of an economical thickness of metal, there is left a recess F which is so deep that the ordinary washer D is too narrow to extend beyond the inner face of the nut, as shown in Fig. 1. A filling piece G is hence provided which makes the recess sufficiently narrow to support the nut in its proper position. Such filling piece G is preferably of sheet metal of U-form in cross-section. According to the present invention I provide means for fixing the filling piece in position so that it cannot become dislodged in use. This is accomplished by bending down a portion of the wall of the nut so that it overlies the filling piece. Preferably there are a plurality of such portions, as indicated at H, the number selected being preferably equal to the flats of the nut. In the preferred manner of practising the invention I use a punch which cuts out the tongues from the wall of the metal, at the same time bending them over the top of the filling piece, as best illustrated in Fig. 4. This is conveniently done by placing the nut in a die or support and plunging the punch, which will simultaneously form the several tongues. In the case of the hexagon nut, a single punch of circular shape is found to admirably effect the result, such punch cutting a small circular section out of each flat, as seen in Fig. 3, and bending the same to proper position. With this means, by a single and rapid operation, the filling piece is adequately secured in the nut.

In the particular instance shown, the screwthreaded portion of the nut is formed on an extension J which projects beyond the outer face of the nut. This extension is formed with an interior thread K adapted to engage the thread of the valve casing B and is also formed with an exterior thread L which is adapted to engage a suitable dust cap. The extension, however, may be reversely arranged so that it projects into the interior of the nut, or any other suitable form of nut may be employed.

While I have shown and described one form of the invention, it will be understood that I do not wish to be limited thereto, since various changes may be made therein within the scope of the claims without departing from the spirit of the invention.

What I claim is:—

1. A nut having a recess, a filling piece in said recess, and means for securing said filling piece therein, comprising portions of the nut cut from the thickness of the wall thereof overlying the filling piece.

2. A nut having a recess, a filling piece in said recess, and means for securing the filling piece therein, comprising tongues cut from the interior of the wall of the nut.

3. A sheet metal nut having flat portions and a recess within said flat portions, a filling piece, and tongues cut from the thickness of the said flat portions and overlying the filling piece.

In witness whereof, I have hereunto signed my name.

HENRY PHILLIP KRAFT.